United States Patent
Kirchhoffer

(12) 
(10) Patent No.: US 10,119,577 B2
(45) Date of Patent: Nov. 6, 2018

(54) COOLING SYSTEM FOR A DRY DUAL CLUTCH OF A DUAL CLUTCH TRANSMISSION

(71) Applicant: FORD GLOBAL TECHNOLOGIES, LLC, Dearborn, MI (US)

(72) Inventor: Johann Kirchhoffer, Köln (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1346 days.

(21) Appl. No.: 13/687,012

(22) Filed: Nov. 28, 2012

(65) Prior Publication Data

US 2013/0134005 A1 May 30, 2013

(30) Foreign Application Priority Data

Nov. 30, 2011 (DE) .................. 10 2011 087 458

(51) Int. Cl.
*F16D 21/06* (2006.01)
*F16D 21/02* (2006.01)
*F16D 13/72* (2006.01)

(52) U.S. Cl.
CPC ............ *F16D 21/02* (2013.01); *F16D 13/72* (2013.01); *F16D 21/06* (2013.01); *F16D 2021/0615* (2013.01); *F16D 2021/0684* (2013.01); *F16D 2300/0212* (2013.01)

(58) Field of Classification Search
CPC ..... F16D 2021/0615; F16D 2021/0684; F16D 13/72

USPC .............. 192/113.23, 113.24, 113.25, 113.26
See application file for complete search history.

(56) References Cited

U.S. PATENT DOCUMENTS

| | | | | |
|---|---|---|---|---|
| 2,290,542 | A * | 7/1942 | Criley ...................... | 192/113.23 |
| 4,026,400 | A * | 5/1977 | Rawlings ................ | F16D 13/38 |
| | | | | 192/48.91 |
| 7,380,645 | B1 * | 6/2008 | Ruiz ...................... | 188/264 AA |
| 2001/0025759 | A1* | 10/2001 | Sarar ........................... | 192/48.8 |
| 2006/0289263 | A1* | 12/2006 | Friedmann et al. ......... | 192/48.8 |
| 2010/0242224 | A1* | 9/2010 | Maguire et al. ................ | 15/389 |
| 2012/0080287 | A1* | 4/2012 | Brevick ..................... | 192/30 R |
| 2012/0299415 | A1* | 11/2012 | Antchak ............... | F16D 41/206 |
| | | | | 310/78 |

FOREIGN PATENT DOCUMENTS

DE 102010007198 A1 12/2010

* cited by examiner

*Primary Examiner* — Stacey A Fluhart
(74) *Attorney, Agent, or Firm* — James Dottavio; MacMillan, Sobanski & Todd, LLC

(57) ABSTRACT

A dual-clutch for a motor vehicle includes an input, first and second outputs, friction plates for producing a drive connection between the input and the first and second outputs alternately, a housing including an inlet and an outlet, containing at least a portion of the friction plates, and a cooling system including a fan impeller rotating with the input and producing an air stream flowing through the housing from the inlet to the outlet.

19 Claims, 7 Drawing Sheets

COOLING SYSTEM FOR A DRY DUAL CLUTCH OF A DUAL CLUTCH TRANSMISSION

BACKGROUND OF THE INVENTION

1. Field of the Invention

The invention relates to a dual-clutch transmission for motor vehicles, having two transmission subsections, a dry dual clutch, which transmits the torque from the engine to one or the other of the two transmission subsections, and a cooling system having a fan impeller for cooling the dual clutch.

2. Description of the Prior Art

Dual clutch transmissions are automatic shift transmissions, which allow a fully automatic gear change without an interruption in power by means of two transmission subsections. The transmission controller chooses the gears automatically or according to driver requirements within the permitted engine speed ranges. Torque is transmitted via one of the two clutches, which connect the two transmission subsections to the engine. While one clutch is closing, the other opens.

Dry dual clutches of this kind often may have inadequate cooling and are susceptible to overheating particularly in the case of small engines, where there is a need for frequent gear changes and the clutch disks are subject to high slip loading, especially when starting off or in stop-and-go mode. In parallel with the overheating, troublesome clutch odor can occur in the passenger compartment when using specific friction linings.

A dual clutch transmission with active air cooling is already known from DE 10 2010 007 198 A1. To generate the cooling air stream, use is made of a fan impeller, which is seated on one of the output shafts of the dual clutch or on one of the transmission input shafts. In this known version, only the starting clutch is cooled. With a cooling system of this kind, the required cooling capacity cannot be provided at high slip speeds.

SUMMARY OF THE INVENTION

A dual-clutch for a motor vehicle includes an input, first and second outputs, friction plates for producing a drive connection between the input and the first and second outputs alternately, a housing including an inlet and an outlet, containing at least a portion of the friction plates, and a cooling system including a fan impeller rotating with the input and producing an air stream flowing through the housing from the inlet to the outlet.

The cooling system for the dry dual clutch adequately cools all the functional components of the dual clutch. The fan impeller rotates with the input shaft driven by an engine, and the cooling air stream generated by the fan impeller can pass through the entire housing of the dual clutch.

Continuous intensive cooling is possible and, due to the fact that the fan impeller rotates with the input shaft of the clutch, that is to say preferably with an engine crankshaft, cooling in accordance with the engine speed is automatically possible.

The fan impeller preferably rotates at the same speed as the shaft coming from the engine, which is synchronized with the input shafts of the dual clutch in accordance with the gear selected. This combination of features can be achieved by particularly simple technical means since the fan impeller need merely be mounted on the engine output shaft or directly coupled thereto.

The fan impeller can be mounted as a separate component on the driving disk, seated on the engine output shaft, of the dual clutch. Alternatively, it is also possible for the fan impeller to be integrated directly into the driving disk, or the fan impeller to be accommodated in the central disk of the clutch.

In either case, however, the driving disk, the central disk and the clutch system may have passage openings for the cooling air, depending on where the fan impeller is seated.

The fan impeller draws in the cooling air from the outside of the clutch housing. The inlet zone for the cooling air into the clutch housing would preferably be located ahead of the fan impeller in the direction of flow.

Since the cooling air stream should reach the entire housing of the dual clutch, the outlet zone for the cooling air preferably lies at the opposite end of the clutch housing from the inlet zone.

In order to ensure that the cooling air is at a sufficiently low temperature, the inlet and outlet zones for the cooling air can be connected by a conduit system to the front radiator of the vehicle. This also ensures that the cooling air is as far as possible dry since it is absolutely essential that the air drawn in should contain no water.

In order to keep the cooling air clean, air filters can be arranged in the cooling air stream in the inlet and outlet zones of the clutch housing.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention is illustrated by way of example in the drawing and is described in detail below with reference to the drawing, in which.

DESCRIPTION OF THE PREFERRED EMBODIMENT

Figure 1:
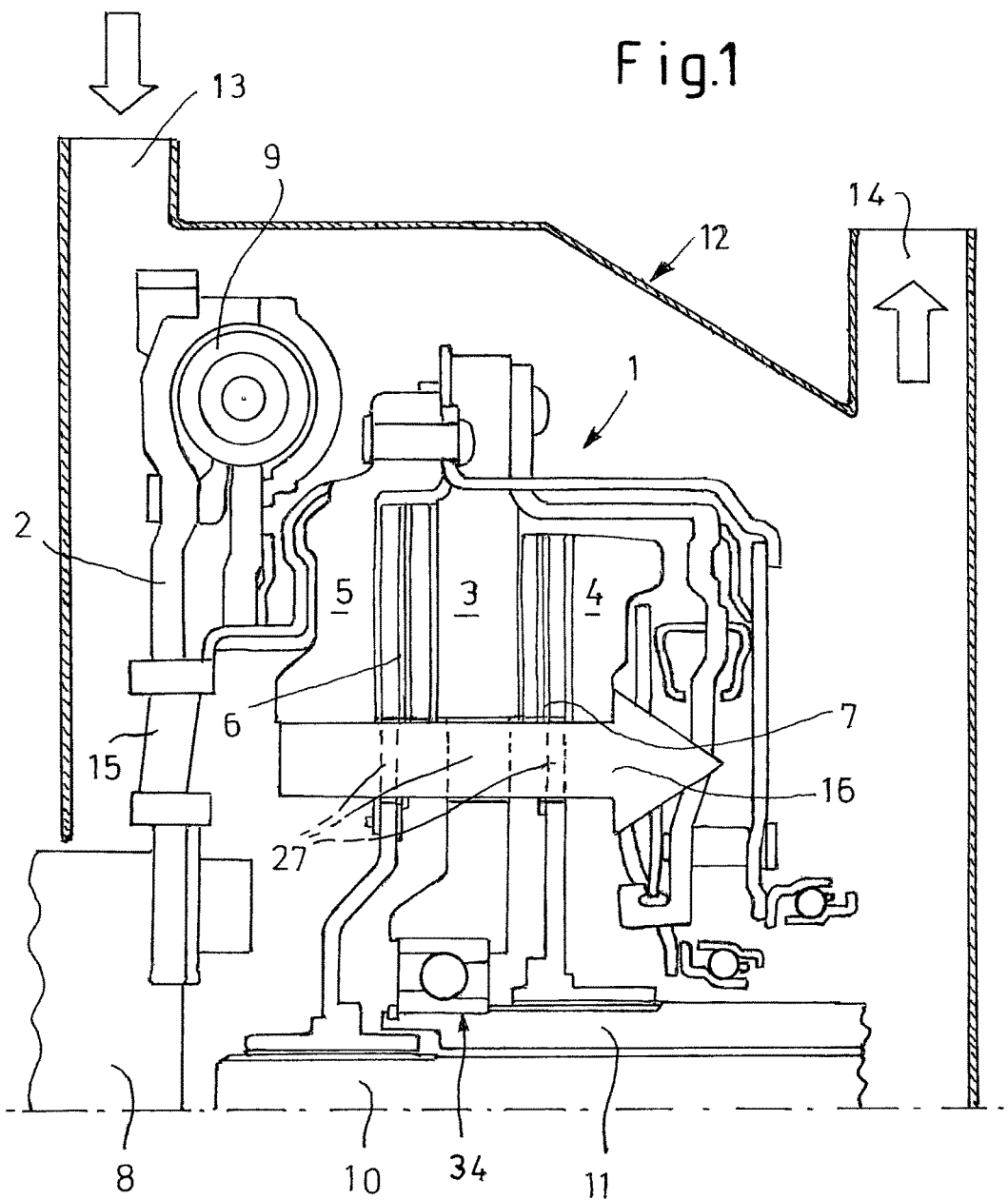
FIG. 1 shows a section through the upper part of a first illustrative embodiment of a dual clutch.

According to FIG. 1 of the drawing, the dual clutch system 1 essentially consists of a driving disk 2, a central disk 3 connected to the latter, pressure plates 4 and 5 provided on both sides of the central disk 3, and friction disks 6 and 7 located between the central disk 3 and the pressure plates 4 and 5 and supported on hubs secured to output shafts 10 and 11, respectively.

The driving disk 2 is seated on the input shaft 8 of the dual clutch 1 for conjoint rotation and consequently rotates with the latter at the same speed. The input shaft 8 is normally the drive shaft or crankshaft of an engine (not shown in the drawing).

The driving disk 2 is connected by way of a torsional damper 9 to the central disk 3, that is to say the central disk 3 revolves at the same speed as the driving disk 2. The pressure plates 4 and 5 arranged on both sides of the central disk 3 revolve with the central disk 3 but can be moved axially relative to the central disk 3. In this arrangement, the central disk is guided radially and supported axially on a hollow shaft bearing 34 by way of a hollow shaft 11.

To initiate the coupling process, one of the pressure plates 4 or 5 is moved towards the central disk 3, thereby pressing the respective friction disk 6 or 7 firmly against the central disk 3.

Because the respective friction disk 6 or 7 is coupled, it rotates with the central disk 3 and transmits the torque of the engine to the respective output shaft 10 or 11 of the dual clutch 1.

The output shaft 10, which can be connected to the friction disk 6 illustrated on the left in the drawing, is designed as a solid shaft and projects into a transmission housing (not shown in the drawing), where it serves to drive a first transmission subsection. This transmission subsection operates gears 1, 3 and 5, for example.

The output shaft 11, which can be connected to the friction disk 7 illustrated on the right in the drawing, is designed as a hollow shaft which surrounds the solid shaft 10. The hollow shaft 11 likewise leads into the transmission housing (not shown in the drawing) and is used to drive a second transmission subsection, which is provided for gears 2, 4, 6 and R, for example.

The entire dual clutch 1 shown in the drawing is surrounded by a clutch housing 12.

In the starting state, especially in stop-and-go mode, in which the respective friction disk 6 or 7 between the central disk 3 and the respective pressure plate 4 or 5 slips, a considerable amount of frictional heat arises, and this must be dissipated since, otherwise, there would be both severe wear on the friction disks 6 and 7 and the generation of smells.

To cool the dual clutch 1, the clutch housing 12 is provided with an air inlet 13 and an air outlet 14. The air inlet 13 is arranged in the region of the input side of the dual transmission 1, and the air outlet 14 is arranged on the output side of the dual transmission 1.

To generate an intensive air stream through the clutch housing 12, a fan impeller 15 is provided, being integrated into the driving disk 2, as illustrated in FIG. 1. The fan impeller 15 thus rotates with the driving disk 2 and hence also with the drive shaft 8 of the engine.

In this design, the cooling air stream 16 generated by the fan impeller 15 is matched to the speed of the input shaft 8, that is to say that, at a relatively high engine speed, at which the friction disks 6 and 7 may also be subject to relatively severe thermal stress, the air stream is also intensified.

By means of this optimum active air cooling of the dual clutch, the temperatures of the clutch system consisting of the central disk 3, the pressure plates 4 and 5 and the friction disks 6 and 7 are reduced, thereby not only reducing wear on the individual clutch components but also stabilizing the friction coefficient of the friction disks 6 and 7. Stabilizing the friction coefficient of the disks also makes it possible to transmit a more stable torque for the same contact force by the pressure plates 4 and 5. Moreover, the generation of smells is significantly reduced.

By virtue of the structural arrangement of the air inlet 13 and of the air outlet 14 at opposite ends of the clutch housing, very intensive air circulation through the entire dual clutch 1 is possible. By virtue of this extremely active air cooling, it may also be possible to reduce the volumes of the cast masses of the central disk 3 and of the pressure plates 4 and 5, and therefore in this respect too savings are possible and clutch losses are reduced, thereby making it possible to compensate for the losses caused by the fan impeller.

In order to be able to convey the cooling air stream 16 through the driving disk 2 at the same level as the fan impeller 15, air passage openings 27 are provided, enabling the cooling air to be drawn out of the zone connected to the air inlet 13, ahead of the driving disk 2, and to be directed through the entire clutch to the air outlet 14.

Figure 2:
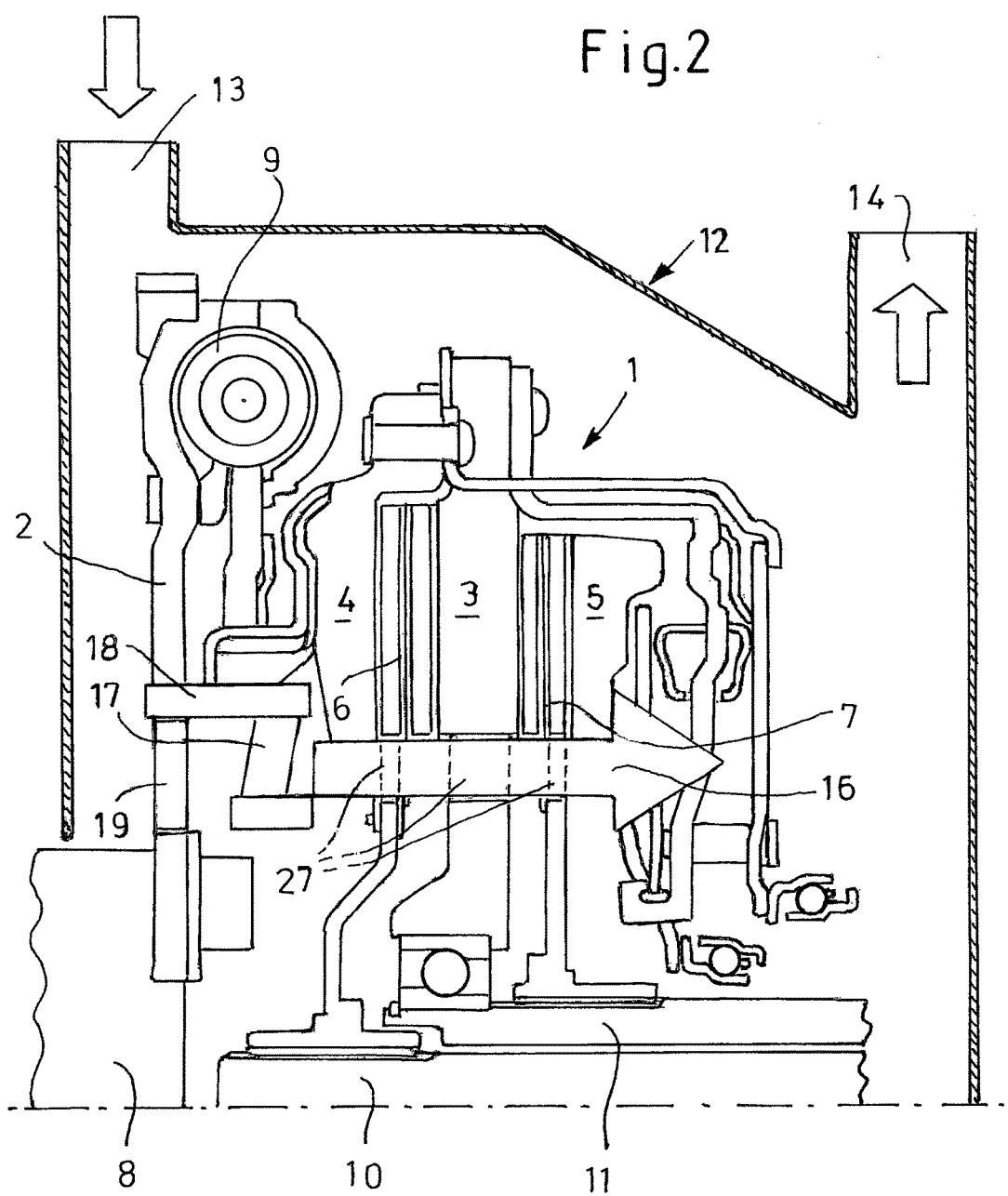
FIG. 2 shows the same section through a second illustrative embodiment of a dual clutch.

In the case of the second illustrative embodiment of the dual clutch 1, which is illustrated in FIG. 2, the same reference numerals are used for corresponding components as in the first illustrative embodiment illustrated in FIG. 1.

In this second illustrative embodiment too, the dual clutch once again consists of the central disk 3, the pressure plates 4 and 5 and the friction disks 6 and 7, which transmit the torque of the engine to the respective output shaft 10 or 11 in the coupled state.

As in the illustrative embodiment illustrated in FIG. 1, the driving disk 2, which is connected to the central disk 3 by way of a torsional damper 9, is seated on the input shaft 8, which starts from the engine and projects into the clutch housing.

In a manner similar to that in the illustrative embodiment illustrated in FIG. 1, a fan impeller 17 is provided, which rotates with the driving disk 2. In this case, the fan impeller 17 is designed as a separate component and is arranged between the driving disk 2 and the coupling zone. Thus, the fan impeller 17 lies behind the driving disk 2 in the direction of flow of the cooling air stream 16. By means of a holder 18, the fan impeller 17 is connected in a substantially rigid manner to the driving disk 2 and therefore rotates at the same speed as the driving disk 2 and the engine shaft 8.

In order to direct the cooling air stream 16 through the driving disk 2, air passage openings 19 and 27 are provided in the driving disk 2 and in the central disk 3 at the same level as the fan impeller 17, cooling air being drawn in by the fan impeller 17 through said openings from the zone connected to the air inlet 13, that ahead of the driving disk 2, and directed by said impeller through the entire clutch to the air outlet 14. For this second illustrative embodiment of the dual clutch 1, the same advantages apply as for the illustrative embodiment shown in FIG. 1.

Figure 3:
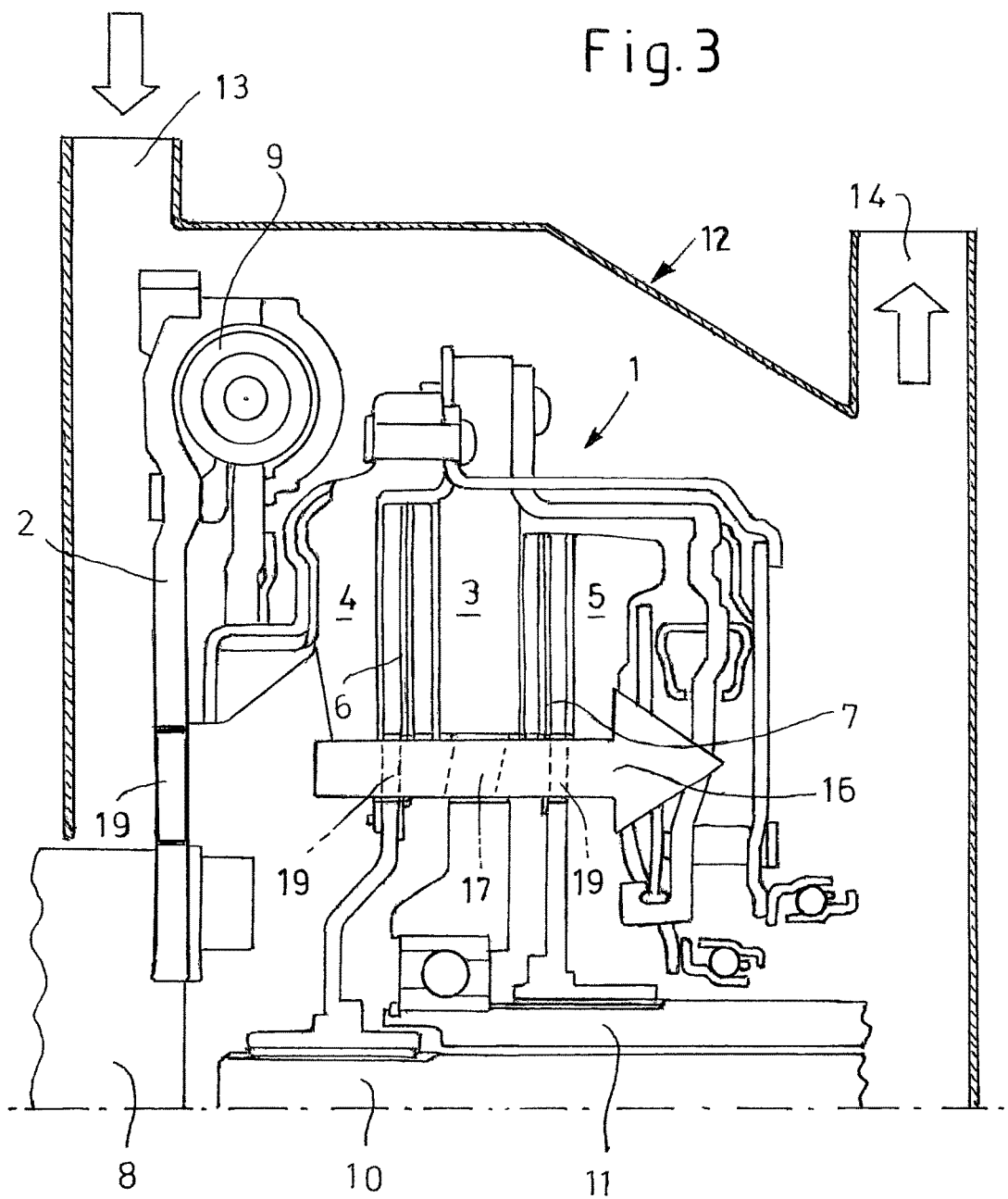
FIG. 3 shows the same section through a third illustrative embodiment of a dual clutch.

In the third illustrative embodiment of the dual clutch 1, which is illustrated in FIG. 3, the same reference numerals are used for corresponding components as in the first illustrative embodiment illustrated in FIG. 1.

In this third illustrative embodiment too, the dual clutch once again consists of the central disk 3, the pressure plates 4 and 5 and the friction disks 6 and 7, which transmit the torque of the engine to the respective output shaft 10 or 11 in the coupled state.

As in the illustrative embodiments illustrated in FIGS. 1 and 2, the driving disk 2, which is connected to the central disk 3 by way of a torsional damper 9, is seated on the input shaft 8, which starts from the engine and projects into the clutch housing.

In a manner similar to that in the illustrative embodiment illustrated in FIG. 2, a fan impeller 17 is provided, which rotates with the central disk 3. In this case, the fan impeller 17 is designed as a separate component and is arranged between the driving disk 2 and the coupling zone. Thus, the fan impeller 17 lies behind the driving disk 2 in the direction of flow of the cooling air stream 16. The central disk 3 is connected to the damper and therefore rotates at the same speed as the driving disk 2 and the engine shaft 8.

In order to direct the cooling air stream 16 through the central disk 3, air passage openings 19 are provided in the driving disk 2 and in the central disk 3 at the same level as the fan impeller 17, cooling air being drawn in by the fan impeller 17 through said openings from the zone connected to the air inlet 13, that ahead of the driving disk 2, and directed by said impeller through the entire clutch to the air outlet 14. For this third illustrative embodiment of the dual clutch 1, the same advantages apply as for the illustrative embodiment shown in FIGS. 1 and 2.

Figure 4:
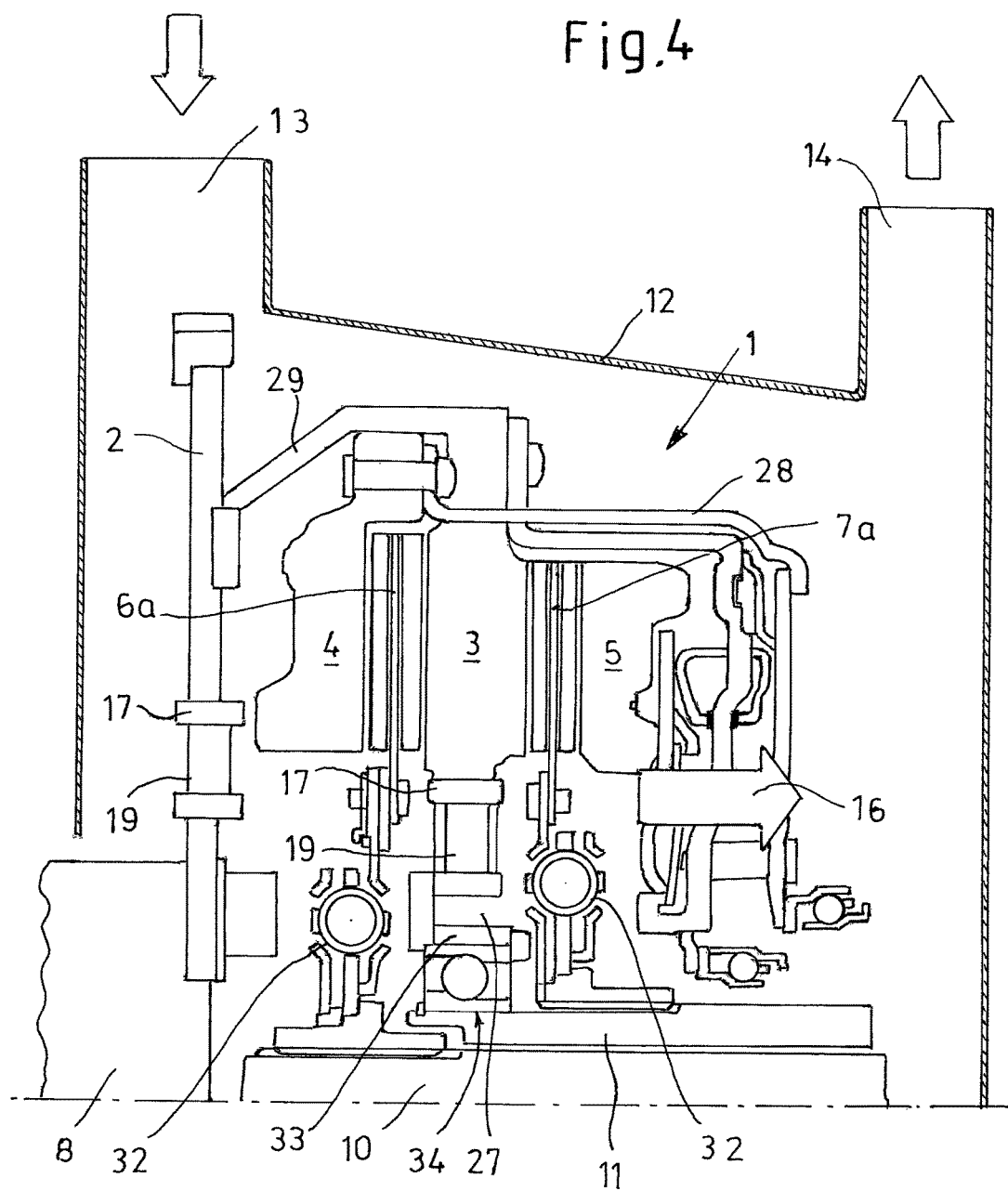
FIG. 4 shows the same section through a second clutch system in which the illustrative embodiments in FIGS. 1 to 3 can be used.

According to FIG. 4 of the drawing, the dual clutch 28 consists essentially of a driving disk 2, a central disk 3 connected to the latter by an intermediate body 29, pressure plates 4 and 5 provided on both sides of the central disk 3, and friction disks 6a and 7a arranged between the central disk 3 and the pressure plates 4 and 5.

The driving disk 2 is seated on the input shaft 8 of the dual clutch 28 for conjoint rotation and consequently rotates with the latter at the same speed. The input shaft 8 is normally the drive shaft or crankshaft of an engine (not shown in the drawing).

The driving disk 2 is connected by way of an intermediate body 29 to the central disk 3, that is to say the central disk 3 revolves at the same speed as the driving disk 2. The pressure plates 4 and 5 arranged on both sides of the central disk 3 revolve with the central disk 3 but can be moved axially relative to the central disk 3. In this arrangement, the central disk 3 is guided radially by way of the intermediate body 29 with the connection to the driving disk 2. Axial support is accomplished by way of the hollow shaft bearing 34 combined with an additional thrust washer 33.

To initiate the coupling process, one of the pressure plates 4 or 5 is moved towards the central disk 3, thereby pressing the respective friction disk 6a or 7a firmly against the central disk 3.

Because the respective friction disk 6a or 7a is coupled, it rotates with the central disk 3 and transmits the torque of the engine to the respective output shaft 10 or 11 of the dual clutch 28.

The output shaft 10, which can be connected to the friction disk 6 illustrated on the left in the drawing, is designed as a solid shaft and projects into a transmission housing (not shown in the drawing), where it serves to drive a first transmission subsection. This transmission subsection operates gears 1, 3 and 5, for example.

The output shaft 11, which can be connected to the friction disk 7 illustrated on the right in the drawing, is designed as a hollow shaft which surrounds the solid shaft 10. The hollow shaft 11 likewise leads into the transmission housing (not shown in the drawing) and is used to drive a second transmission subsection, which is provided for gears 2, 4, 6 and R, for example.

The entire dual clutch 28 shown in the drawing is surrounded by a clutch housing 12.

In the starting state, especially in stop-and-go mode, in which the respective friction disk 6a or 7a between the central disk 3 and the respective pressure plate 4 or 5 slips, a considerable amount of frictional heat arises, and this must be dissipated since, otherwise, there would be both severe wear on the friction disks 6a and 7a and the generation of smells.

To cool the dual clutches 1 and 28, the clutch housing 12 is provided with an air inlet 13 and an air outlet 14. The air inlet 13 is arranged in the region of the input side of the dual transmissions clutches 1 and 28, and the air outlet 14 is arranged on the output side of the dual transmissions clutches 1 and 28.

To generate an intensive air stream through the clutch housing 12, a fan impeller 17 is provided, being integrated either into the driving disk 2 or into the central disk 3, as illustrated in FIG. 1. The fan impeller 17 thus rotates with the driving disk 2 and hence also with the drive shaft 8 of the engine, this being equivalent to the embodiments shown in FIGS. 1 and 2.

In this design, the cooling air stream 16 generated by the fan impeller 17 is matched to the speed of the input shaft 8, that is to say that, at a relatively high engine speed, at which the friction disks 6/6a and 7/7a may also be subject to relatively severe thermal stress, the air stream is also intensified. The friction disks 6a and 7a can optionally be embodied with a damper system 32.

Figure 5:
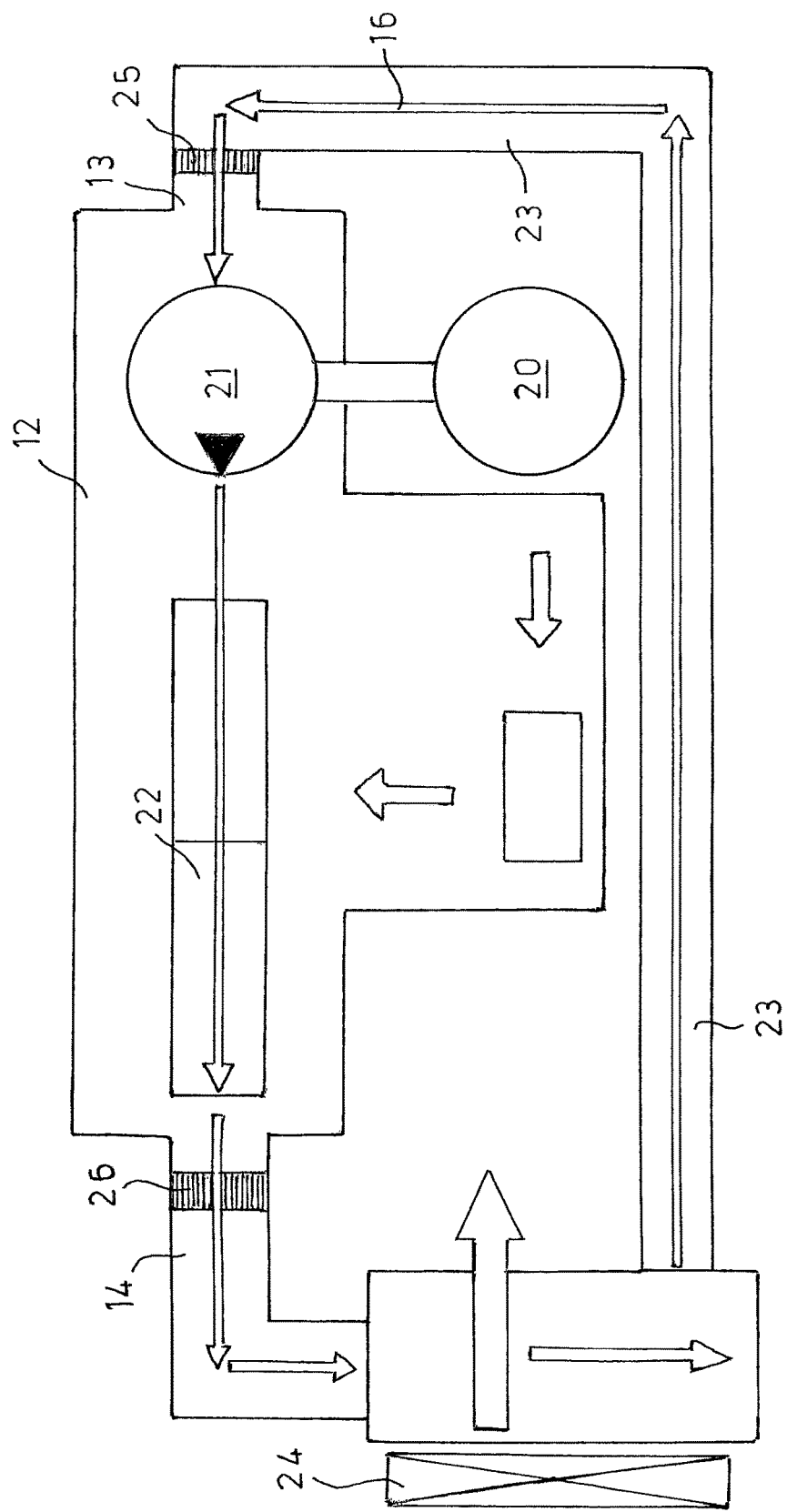
FIG. 5 shows a schematic overview of one possibility for directing the cooling air stream.

An illustrative embodiment of one possibility for directing the cooling air stream is shown schematically in FIG. 5. The individual components are illustrated only schematically.

A fan impeller 21 represented as a circle is driven by a motor 20, likewise represented as a circle. This fan impeller 21 is arranged ahead of a dual clutch 22. The cooling air stream 16 is passed through a conduit system 23, which starts from the front radiator 24 and is introduced into the clutch housing 12 through an inlet filter 25 arranged in the air inlet of the clutch housing 12.

The fan impeller 21 driven by the motor 20 blows the cooling air through both clutch sections of the dual clutch 22. The cooling air stream heated up therein then passes back to the front radiator 24 through the air outlet 14 and an outlet filter 26 arranged in the air outlet 14.

Routing the air in this way ensures that the cooling air is free of water. It is furthermore ensured that the cooling air flowing through the clutch components remains clean owing to the filters 25 and 26 arranged in the air inlet 13 and the air outlet 14 of the clutch housing 12.

Figure 6:
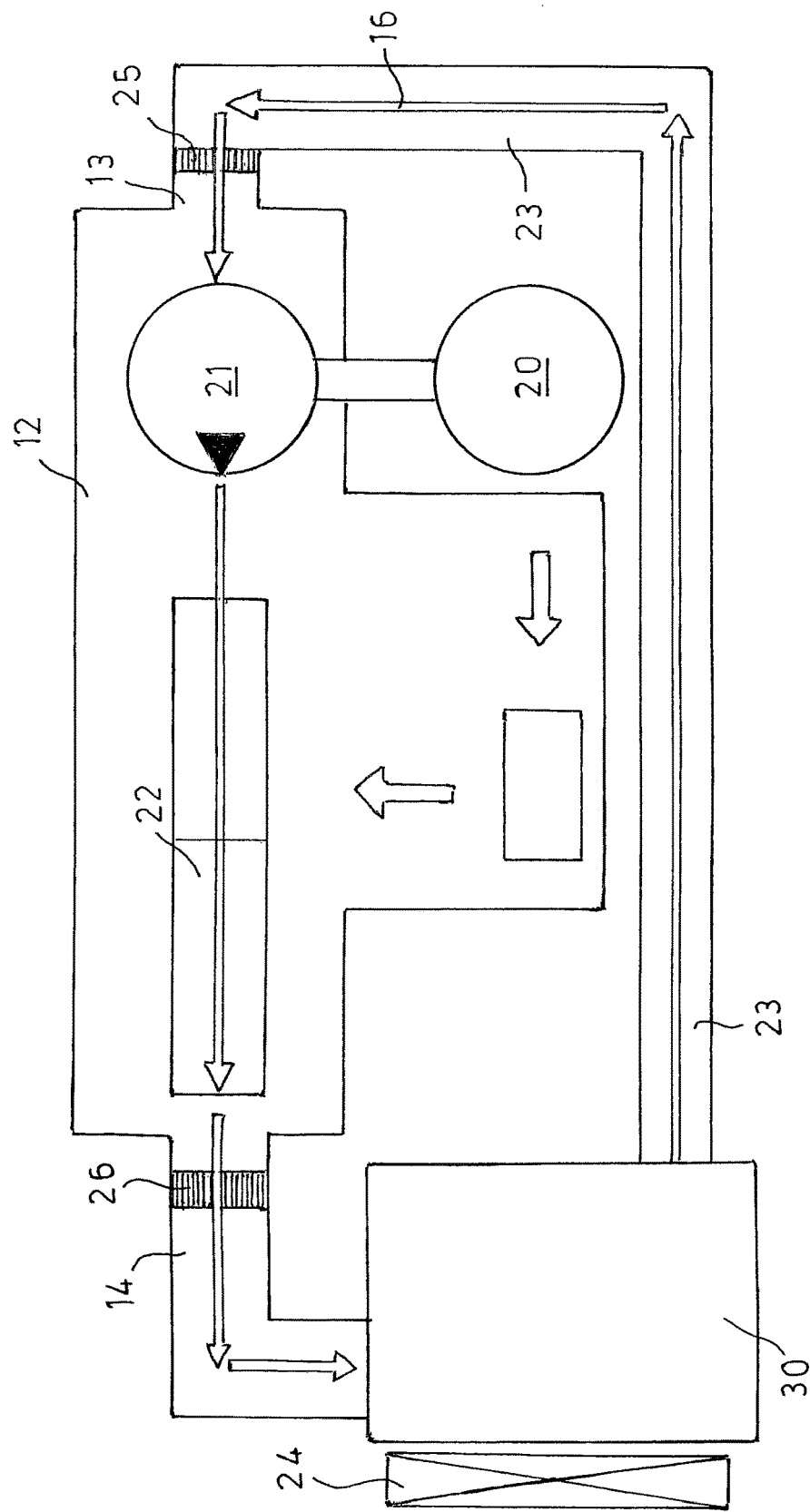
FIG. 6 shows a schematic overview of a second possibility for directing the cooling air stream.

FIG. 6 shows the same cooling circuit as in FIG. 5 but without the main radiator. In this version, the heat from the clutch is exchanged with the environment at the front end 30 of the vehicle.

Figure 7:
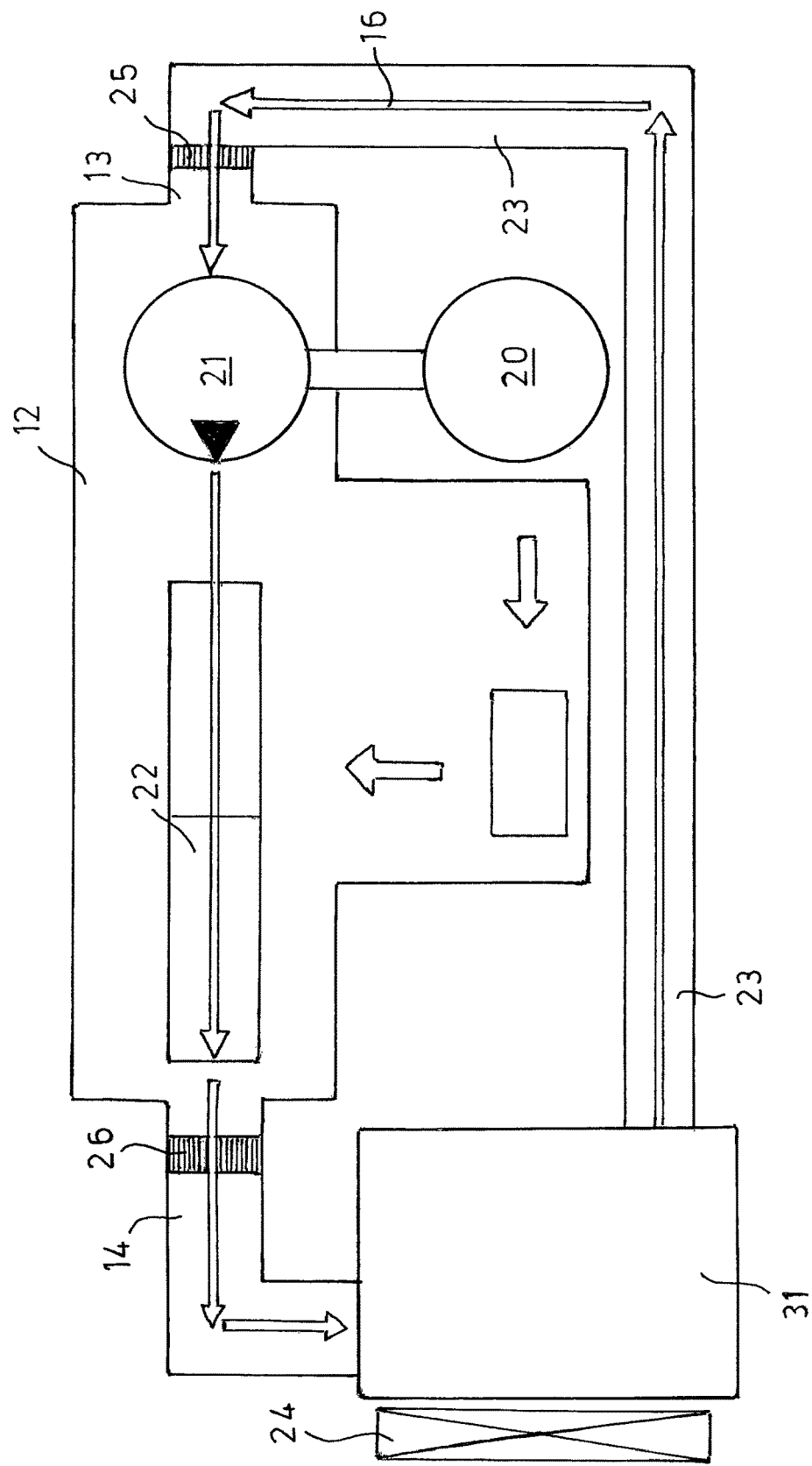
FIG. 7 shows a schematic overview of a third possibility for directing the cooling air stream.

FIG. 7 shows the same cooling circuit as in FIG. 6 without the radiator, with heat exchange taking place in the region 31 of the engine.

By means of the invention, therefore, an optimum active cooling system for a dry dual clutch is provided, thus increasing the performance thereof, reducing wear and possibly even enabling the cast masses of various clutch disks to be reduced and hence also reducing the generation of smells.

LIST OF REFERENCE SIGNS 1 dual clutch/system 1
2 driving disk
3 central disk
4 pressure plate
5 pressure plate
6 friction disk
6a friction disk—with damper 7 friction disk
7a friction disk with damper
8 input shaft
9 torsional damper
10 output shaft (solid shaft)
11 output shaft (hollow shaft)
12 clutch housing
13 air inlet
14 air outlet
15 fan impeller
16 cooling air stream
17 fan impeller
18 holder
19 air passage opening
20 motor
21 fan impeller
22 dual clutch
23 conduit system
24 front radiator
25 inlet filter
26 outlet filter
27 air passage openings
28 dual clutch/system 2
29 intermediate body, dual clutch
30 front region of vehicle—no radiator
31 region of the engine—no radiator
32 damper
33 thrust washer
34 hollow shaft bearing In accordance with the provisions of the patent statutes, the preferred embodiment has been described. However, it should be noted that the alternate embodiments can be practiced otherwise than as specifically illustrated and described.

The invention claimed is:

1. A dual-clutch for a vehicle, comprising:
a central disk driveably connected to an input;
first and second pressure plates located on opposite sides of the central disk;
first and second outputs;
first friction plates adjacent to the first pressure plate and second friction plates adjacent to the second pressure plate for producing a-drive connections between the input and the first and second outputs alternately;
a housing including an inlet and an outlet, containing at least a portion of the friction plates;
a cooling system including a fan impeller integral with the central disk rotating with the input and producing an air stream flowing through the housing from the inlet to the outlet.

2. The dual clutch of claim 1, wherein the fan impeller rotates at a speed of the input, the input being driveably connected to an engine.

3. The dual clutch of claim 2, further comprising:
a driving disk driveably connected to and seated on the input.

4. The dual clutch of claim 3, wherein:
the central disk is supported by a bearing on one of the first output and the second output.

5. The dual clutch of claim 1, further comprising:
a driving disk driveably connected to the input, and having passage openings for directing the air stream from the inlet, through the clutch to the outlet.

6. The dual clutch of claim 5, wherein the inlet is located radially outward from the driving disk upstream of the fan impeller such that air flows from the inlet through the driving disk prior to flowing through the central disk.

7. The dual clutch of claim 1, wherein the outlet is located at an axially opposite end of the clutch housing from the inlet and at an axially opposite end of the clutch housing from the input.

8. The dual clutch of claim 1, further comprising:
a conduit system extending outside of the housing, through which the air stream flows from the outlet to a radiator of the vehicle and back to the inlet.

9. The dual clutch of claim 8 further comprising:
a first air filter located in the inlet; and
a second air filter located in the outlet.

10. The dual clutch of claim 1, wherein the inlet and outlet are open external to the vehicle.

11. The dual clutch of claim 1, wherein the inlet and outlet are located within an engine compartment of the vehicle.

12. The dual clutch of claim 1, further comprising:
a first air filter located in the inlet; and
a second air filter located in the outlet.

13. A dual-clutch for a vehicle, comprising:
a central disk driveably connected to an input;
pressure plates located on opposite sides of the central disk;
friction plates producing drive connections between the input and first and second outputs alternately;
a housing including an inlet and an outlet;
a cooling system including a fan impeller rotating with the input and a conduit through which air flows from the outlet to a vehicle radiator and to the inlet.

14. The dual clutch of claim 13, further comprising:
a driving disk driveably connected to and seated on the input, the fan impeller being secured for rotation with the driving disk.

15. The dual clutch of claim 14, wherein the fan impeller is mounted on the driving disk, axially spaced from the driving disk toward the central disk.

16. The dual clutch of claim 14, wherein the central disk is supported axially and radially by a bearing and a thrust washer on one of the first output and the second output, and the fan impeller is integral with the central disk.

17. The dual clutch of claim 13, further comprising:
a driving disk driveably connected to the input and having passage openings for directing the air stream from the inlet through the central disk and the friction plates to the outlet.

18. The dual clutch of claim 17, wherein the inlet is located radially outward from the driving disk upstream of the fan impeller such that air flows from the inlet through the driving disk prior to flowing through the central disk.

19. A dual-clutch for a vehicle, comprising:
a central disk driveably connected to an input;
pressure plates located on opposite sides of the central disk;
friction plates producing drive connections between the input and first and second outputs alternately;
a housing including an inlet and an outlet;
a cooling system including an impeller producing airflow between the inlet and outlet;
first and second air filters in the inlet and outlet, respectively.

* * * * *